United States Patent [19]

Lee

[11] Patent Number: 5,079,204
[45] Date of Patent: Jan. 7, 1992

[54] POLYMERIZATION CATALYST, PREPARATION, AND USE

[75] Inventor: Clifford C. Lee, Houston, Tex.

[73] Assignee: Phillips Petroleum Company, Bartlesville, Okla.

[21] Appl. No.: 516,855

[22] Filed: Apr. 30, 1990

[51] Int. Cl.$^5$ ................................................ C08F 4/646
[52] U.S. Cl. ...................................... 502/104; 502/103; 502/107; 502/113; 502/117; 502/134; 526/125
[58] Field of Search ............... 502/104, 107, 103, 113, 502/117, 134

[56] References Cited

U.S. PATENT DOCUMENTS

| | | | |
|---|---|---|---|
| 3,535,299 | 10/1976 | Dassesse et al. | 260/88.2 |
| 4,325,837 | 4/1982 | Capshew et al. | 252/429 B |
| 4,326,988 | 4/1982 | Welch et al. | 252/429 B |
| 4,363,746 | 12/1982 | Capshew | 252/429 B |
| 4,562,168 | 12/1985 | Lee | 502/107 |

*Primary Examiner*—Patrick P. Garvin
*Attorney, Agent, or Firm*—Edward L. Bowman

[57] ABSTRACT

A process as disclosed for improving the particle size of a olefin polymerization catalyst. The process involves combining the catalyst with an alkoxide-containing liquid comprising a transition metal alkoxide and an aluminum alkyl, causing said alkoxide and said aluminum alkyl to react for form a precipitate and then recovering the resulting solid. Also disclosed are the catalysts produced by such a process and the use of such catalysts in the polymerization of olefins.

13 Claims, No Drawings

POLYMERIZATION CATALYST, PREPARATION, AND USE

The present invention relates to catalysts, methods of producing such catalysts, and processes of using such catalysts.

BACKGROUND OF THE INVENTION

About 30 years ago the researchers Ziegler and Natta and others developed certain catalysts having utility for the polymerization of α-olefins. Typically these catalysts involved forming heterogeneous slurries of solutions of transition metal compounds with organometallic compound cocatalyst. Typically the organometallic cocatalyst were selected from compounds of metals of Group IA, IIA and IIIA of the Periodic Table and the transition metal compounds were selected from compounds of the metals of Groups IIB, IVB, and VB of the Periodic Table.

Since that time second and third generation catalysts have been developed which have significantly higher activity in terms of grams of polyolefins produced per gram of catalyst than the early transition metal catalysts. In addition, the second and third generation catalysts are generally capable of providing higher isotactic index polymers when propylene or other monomers capable of giving polymers with tacticity are employed.

Many of the methods used in making the high activity catalysts and even lower activity catalysts often produce particulate catalyst compositions containing undesired levels of catalyst "fines". In most cases the presence of catalyst "fines" has resulted in polymer products which also have an undesirable level of fines. The presence of significant amounts of polymer "fines" can lead to handling problems for the catalyst or the polymer produced with it. For safety reasons and for ease of polymer processing and handling, it is therefore desirable to minimize the production of polymer fines especially those which would pass through a 200 mesh sieve.

Various techniques have been employed to produce olefin polymerization catalysts with minimal fines.

An object of the present invention is therefore to provide a novel and improved method for preparing catalyst compositions.

Another object of the present invention is to provide a novel catalyst composition well adapted for the polymerization of α-olefins. A further object of the present invention is to provide an improved process for the polymerization of α-olefins. Still another object of the present invention is to provide a process for producing α-olefin based polymers having relatively low levels of polymer fines.

These and other objects of the present invention will be apparent from the disclosure, examples, and claims provided herein.

SUMMARY OF THE INVENTION

In accordance with the present invention there is provided a method for increasing the particle size of a particulate olefin polymerization catalyst comprising combining said particulate catalyst with (1) an alkoxide-containing liquid comprising an alkoxide of titanium, vanadium, or zirconium and (2) an aluminum alkyl and causing said alkoxide and said aluminum alkyl to react to form a precipitant, and then recovering the resulting solid.

Still further in accordance with this invention there is provided a method for polymerizing olefinic monomers, comprising contacting the monomer under suitable olefin polymerization conditions with a particulate olefin polymerization catalyst prepared by the above-described process.

Further, in accordance with the present invention there is provided the particulate olefin polymerization catalyst resulting from the above-described process.

DETAILED DESCRIPTION OF THE INVENTION

This invention is considered applicable to any catalyst having a large percentage of fine catalyst particles. The invention has particular application for situations in which the catalyst has an average particle diameter in the range of 100 to 180 microns or less, especially when the average particle diameter is 20 microns or less. The process has been found to be particularly applicable to solid transition metal containing olefin polymerization catalysts. Such particulate transition metal-containing olefin polymerization catalyst are generally prepared from the halides, oxyhalides, oxides, hydroxides, hydroxy halides, alkoxy halides, acetates, benzoates, acetyl acetenates, and alkoxides of transition metal compounds of Groups IVB–VIII of the Periodic Table, e.g. titanium, zirconium, hafnium, thorium, vanadium, niobium, tantalum, chromium, molybdenum, tungsten, manganese, and iron. Generally, the currently most preferred catalysts for polymerizing olefins are those catalysts prepared from titanium, vanadium, zirconium, or mixtures thereof. Some particular catalysts to which the present invention can be applied include those disclosed in U.S. Pat. Nos. 4,363,746; 4,394,291; 4,107,414; 4,618,661; 4,626,519; 4,555,496; 4,524,195; 4,384,982; and 4,397,763. The disclosures of all the patents mentioned in the preceding sentence are incorporated herein by reference.

Any suitable liquid can be employed for forming the alkoxide-containing liquid. As a general rule liquids would be selected which are generally used in the preparation of transition metal containing catalyst or in the polymerization using such catalysts. Generally hydrocarbon liquids are preferred. Examples of such liquids include n-pentane, n-hexane, n-heptane, methylcyclohexane, toluene, xylene, and the like. Generally inert liquids other than hydrocarbons can also be employed. Examples would include dichloromethane, dichloroethane, and the like.

The particular alkoxide and aluminum alkyl employed in the alkoxide-containing liquid can vary depending upon the particular characteristics of the starting particulate catalyst. As a general rule the alkoxides would be titanium, vanadium, or zirconium compounds containing at least one alkoxy group wherein the alkyl radical of the alkoxy group has 1 to 8 carbon atoms. Currently it is preferred to employ a titanium alkoxide of the formula $Ti(OR)_n X_{4-n}$ wherein n is an integer in the range of 1 to 4, X is a halogen and each R is individually selected from an alkyl group containing 2 to 6 carbon atoms. Some typical examples of such alkoxides include titanium tetraethoxide, titanium tetra n-butoxide, titanium tetrahexyloxide and the like.

The alkylaluminum compound employed with the alkoxide-containing liquid is selected from compounds of the formula $AlR_n X_{3-n}$ wherein n is a number in the range of 1 to 3, X is a halogen, and each R is individually selected from an alkyl group containing 1 to 20 carbon atoms more preferably about 2 to 6 carbon atoms. Some specific examples of such compounds include triethylaluminum, trimethylaluminum, diethylmethylaluminum, methylaluminum dibromide, diethylaluminum chloride, ethylaluminum sesquichloride, and the like.

It is also with the scope of the present invention to include in the alkoxide-containing liquid other materials which assist in the agglomeration of the particulate catalyst. Examples would include low molecular weight polymers such as polysiloxanes, in particular polydimethylsiloxanes.

The particulate olefin polymerization catalyst and the alkoxide-containing liquid can be combined in any suitable manner. Generally, it is preferred to add the particulate catalyst to the alkoxide-containing liquid which is already containing the alkylaluminum halide. It is however within the scope of the present invention to combine all three components sequentially or simultaneously. It is generally preferable to stir the mixture to obtain a generally homogeneous suspension of the particulate catalyst while the precipitation is effected as a result of the reaction of the alkoxide with the aluminum alkyl.

The molar ratio of the alkoxide to the aluminum alkyl can vary over a relatively broad range. Generally, it is preferred that the molar ratio of the alkoxide to the aluminum alkyl be in the range of from about 10 to 1 to about 1 to 10.

Generally in order to speed up the reaction between the alkoxide and the aluminum alkyl, it is desirable to heat the mixture while it is being stirred. Generally this would involve heating the mixture to a temperature of at least about 50° C., more typically in the range of about 50° C. to about 110° C., and even more preferably in the range of about 90° C. to about 110° C. The mixture would be maintained at a temperature in that range for a length of time sufficient to result in the formation of a suitable amount of precipitate to improve the particle size of the starting particulate catalyst. After the described treatment the recovered solids can be contacted with a halogen ion exchanging agent, i.e. a compound capable of increasing the halogen content of the solid and of increasing the polymerization activity of the solid. Some typical examples of such halogenating agents considered to be suitable include compounds having at least one halogen bonded to an element selected from the group consisting of H, S, C, B, Si, Sn, Ge, P, Pi, Zr, and V. Some typical examples of such compounds include carbon tetrachloride, boron trifluoride, silica tetrachloride, trichlorosilane, tin tetrachloride, $PCl_3$, benzoyl chloride, acetyl chloride, HCl, $Si_4Cl_{10}$, $(CH_3)_2SiCl_2$, titanium tetrachloride, $VOCl_3$, $SOCl_2$, and the like.

The relative amounts of alkoxide-containing liquid that should be employed with a particular particulate catalyst for optimum results can be determined by routine experimentation.

The catalyst produced by the present invention can be employed in the polymerization of olefins using the conventional techniques generally used for the polymerization of olefins in the presence of transition metal type catalyst systems. It is well known that such reactions can be carried out in solution or in suspension in a hydrocarbon solvent or diluent, in the gas phase, or in the monomer kept in a liquid state. The solvent or diluent is generally selected from an alkane or cycloalkane, such as isobutane, pentane, hexane, heptane, or cyclohexane, or a mixture thereof. The polymerization pressure is generally between atmospheric pressure and 100 bars and a temperature is generally between 20° C. and 200° C.

A variety of compounds can be polymerized with the catalysts produced by the present invention. Olefins which can be homopolymerized or copolymerized with the invention catalyst include aliphatic mono-1-olefins. Olefins having 2 to 18 carbon atoms are most often used as the monomers or comonomers. Some typical examples of 1-olefins include ethylene, propylene, and 4-methyl-1-pentene. The mono-1-olefins can be polymerized according to the present invention employing either a particle form process, a solution form process, or a gas phase process. Aliphatic mono-1-olefins can be copolymerized with other 1-olefins and/or small amounts of other ethlenically unsaturated monomers, such as 1,3-butadiene, isoprene, 1,3-pentadiene, styrene, alpha-methylstyrene, and similar ethlenically unsaturated monomers which do not impare the catalyst.

Some of the catalysts of this invention can also be used to prepare homopolymers and copolymers of conjugated diolefins. Generally the conjugated diolefins contain 4 to 8 carbon atoms per molecule. Examples of suitable conjugated diolefins include 1,3-butadiene, isoprene, 2-methyl-1,3-butadiene, 1,3-pentadiene, and 1,3-octadiene. Typical comonomers, besides the conjugated diolefins listed above include mono-1-olefins of the type previously described and vinyl aromatic compounds generally. Some suitable vinyl aromatic compounds are those having from about 8 to about 14 carbon atoms per molecule, and include for example styrene and various alkylstyrenes such as 4-ethylstyrene and compounds such as 1-vinyl-napthalene.

Typically the catalyst of the present invention will be used with a suitable amount of a cocatalyst selected from organometallic compounds of metals of Groups IA through IIIA of the Periodic Table. The most common organometallic cocatalyst is an organoaluminum compound of the formula $AlR_nX_{3-n}$, in which R is a hydrocarbon radical containing from about 1 to 20 carbon atoms, X is a halogen and n is a number such that $0 < n \leq 3$. R is preferably chosen from among alkyl, alkenyl, aryl, cycloalkyl, arylalkyl, and alkaryl radicals. If the organoaluminum compound contains a halogen, it is generally preferred that the halogen be chlorine.

Some examples of organoaluminum cocatalysts frequently used are triethyl-, triisobutyl-, trihexyl-, and trioctyl-aluminum, and ethylaluminum chlorides.

A further understanding of the present invention, its advantages and objects, will be provided by the following examples.

EXAMPLE I

This example involves the improvement of a titanium based catalyst of the type disclosed in U.S. Pat. No. 4,363,746. In preparing this catalyst 6,200 grams of magnesium chloride and 60 lbs. of titanium tetraethoxide were heated together in a hydrocarbon to form a solution. After cooling 130 lbs. of ethylaluminum sesquichloride was added to the solution precipitate the catalyst. The catalyst was then washed several times with n-hexane. Then 15 lbs. of titanium tetraethoxide and 32 lbs. of ethylaluminum sesquichloride were added to an n-hexane mixture of the resulting precitate. Then the mixture was heated up to 100° C. for 30 minutes. After cooling and washing with n-hexane several times, the particulate solid was contacted with titanium tetrachloride. The final yield was 49 lbs.

It was known from past experience that if the inventive step had been eliminated the resulting catalyst would have had high activity but would have produced fines as taught in U.S. Pat. No. 4,326,988 and U.S. Pat. No. 4,562,168. Particularly such catalyst would have produced polyethylene having high levels of polymer fines of less than 100 mesh.

In contrast, the inventive catalyst prepared as described above when employed in the polymerization of ethylene gave low polymer fines, specifically 5.7 percent below 200 mesh and about 6.3 percent below 100 mesh. The catalyst was still a very active catalyst. The activity was 21,300 grams of polyethylene per gram of catalyst per hour for producing a polyethylene having a melt index of 26.1. This demonstrates that by employing the present invention one can obtain an improvement in catalyst and polymer fines analogous to that which is obtained by either the use of prepolymerization during the catalyst preparation or by using the special process disclosed in U.S. Pat. No. 4,562,168.

That which is claimed is:

1. A method for increasing the particle size of a particulate olefin polymerization catalyst comprising combining said particulate catalyst with (1) an alkoxide-containing liquid comprising an alkoxide of titanium, vanadium, or zirconium and (2) an aluminum alkyl and further causing said alkoxide and said alkyl aluminum to react to form a precipitate, and recovering the resulting solid.

2. A method according to claim 1 wherein said alkoxide is selected from compounds of the formula $Ti(OR)_nX_{4-n}$ wherein n is an integer in the range of 1 to 4, X is a halogen, and each R is individually selected from alkyl groups containing 1 to 6 carbon atoms.

3. A method according to claim 2 wherein said aluminum alkyl is selected from compounds of the formula $AlR_nX_{3-n}$ wherein n is a number in the range of 1 to 3, X is a halogen, and each R is individually selected from alkyl groups containing 1 to 6 carbon atoms.

4. A method according to claim 3 wherein said alkoxide-containing liquid further contains a polysiloxane.

5. A method according to claim 3 wherein said catalyst is prepared by forming a hydrocarbon solution of a magnesium dichloride and a titanium compound selected from titanium tetraethoxide and titanium tetrabutoxide, reacting said hydrocarbon solution with ethylaluminum sesquichloride to obtain a precipitate, washing the precipitate several times with the hydrocarbon liquid, and then combining said precipitate with said alkoxide-containing liquid, causing the aluminum alkyl and the alkoxide in said alkoxide-containing liquid to react to form a precipitate, and then recovering the resulting precipitate.

6. A method according to claim 5 wherein said alkoxide-containing liquid comprises titanium tetraethoxide and ethylaluminum sesquichloride.

7. A method according to claim 6 wherein said precipitate resulting from the reaction of said alkoxide and said aluminum alkyl is then contacted with titanium tetrachloride in an amount sufficient to improve the olefin polymerization activity of said precipitate.

8. A polymerization catalyst prepared by the process of claim 7.

9. A catalyst produced by the process of claim 1.

10. A process according to claim 1 wherein said catalyst that is combined with said alkoxide containing liquid consists essentially of titanium, magnesium, aluminum, and oxygen atoms.

11. A process according to claim 1 wherein said alkoxide-containing liquid is stirred while said alkoxide is reacting with said aluminum alkyl.

12. A process according to claim 11 wherein said alkoxide-containing liquid consists essentially of titanium tetraethoxide and said aluminum alkyl consists essentially of ethylaluminum sesquichloride.

13. A process according to claim 3 wherein said alkoxide-containing liquid consists essentially of a titanium tetraalkoxide and said aluminum alkyl consists essentially of ethylaluminum sesquichloride.

* * * * *